United States Patent [19]

Jelen

[11] 4,304,382

[45] Dec. 8, 1981

[54] PEGBOARD FASTENERS

[76] Inventor: William J. Jelen, 24634 Water St., Olmsted Falls, Ohio 44138

[21] Appl. No.: 27,605

[22] Filed: Apr. 6, 1979

[51] Int. Cl.³ .......................... E04G 5/06; F16L 3/08

[52] U.S. Cl. .................................. 248/221.1; 211/89; 248/221.4

[58] Field of Search ............... 248/220.3, 220.4, 221.1, 248/221.2, 221.3, 225.1, 221.4; 211/89

[56] References Cited

U.S. PATENT DOCUMENTS

| | | | |
|---|---|---|---|
| 724,427 | 4/1903 | Bonsall | 248/221.2 X |
| 2,879,899 | 3/1959 | Shenkin | 248/220.4 X |
| 2,961,724 | 11/1960 | Alling | 248/221.2 X |
| 2,987,286 | 6/1961 | Alling | 248/220.3 |
| 3,070,235 | 12/1962 | Manzardo | 248/220.3 X |
| 3,187,902 | 6/1965 | Nelson | 248/221.1 X |
| 3,195,846 | 7/1965 | Dahlhauser | 248/221.1 |
| 3,294,347 | 12/1966 | Mongesku et al. | 248/221.1 X |
| 3,640,497 | 2/1972 | Waki | 248/220.4 |
| 3,921,948 | 11/1975 | Long | 248/220.4 |

FOREIGN PATENT DOCUMENTS

| | | | |
|---|---|---|---|
| 1562845 | 11/1967 | France | 248/220.3 |
| 934767 | 8/1963 | United Kingdom | 248/220.4 |

*Primary Examiner*—J. Franklin Foss
*Attorney, Agent, or Firm*—J. Helen Slough

[57] ABSTRACT

A device for mounting objects on a pegboard. A fastener spans the distance between holes in a pegboard. In one embodiment the fastener has S-shaped hooks at opposing ends which are inserted into holes in the pegboard. In another embodiment the fastener has a C-shaped hook at one end and an S-shaped hook at the other end. The hooks grip the pegboard between them in cooperative reactive spring tension. The fastener may have an integrally formed means for retaining objects and it may also be used to fasten separate retaining means to the pegboard. The fastener and retaining means may be fabricated from a single piece of sheet metal. One embodiment of the fastening means comprises a pair of dimpled tabs for retaining sockets of socket drive sets.

6 Claims, 11 Drawing Figures

PEGBOARD FASTENERS

This invention relates to mounting objects such as tools and the like on pegboards.

Pegboards are often used as display and storage devices for tools and the like. Many devices have been developed for the purpose of mounting and fastening objects to pegboards. Most sought after are devices that are simple, economical, and easy to use, but which nonetheless strongly fasten objects to the pegboard. Also highly desired are devices which are removable, so that objects on the pegboard may be rearranged.

A number of devices have been developed for mounting objects from two or more holes in a perforated board. U.S. Pat. No. 3,187,902 (Nelson) discloses a plastic multiple tool holder which uses notched lugs for fastening the holder to the pegboard by engaging the rear face of the pegboard. U.S. Pat. No. 3,640,497 (Waki) discloses a detachable support device for pegboards which uses two pivotally mounted clamping members biased by a spring for fastening the device to the pegboard. U.S. Pat. No. 2,529,372 (Burns) discloses a tool holder which uses spring hooks and anchoring pins for mounting the tool holder to a perforated wall. U.S. Pat. No. 2,868,489 (Calcut) discloses a fastener assembly and clip which uses cammed arms to fasten the assembly to a perforated plate. U.S. Pat. No. 3,921,948 (Long) discloses a pegboard container holder which uses knob anchors larger than holes in the pegboard to aid in securing the holder to a pegboard. U.S. Pat. No. 3,682,426 (Owen) discloses a pegboard hanger which uses a pair of members which are spring biased apart to help fasten the hanger to a pegboard.

There are other devices which fasten objects to a single hole in a perforated plate. U.S. Pat. No. 2,728,259 (Poupitch) discloses a resilient rotary sheet metal fastener for fastening a plurality of panels together. U.S. Pat. No. 3,031,161 (Hawie) discloses a display means for use with a perforated support. U.S. Pat. No. 2,166,916 (Lombard) discloses a clip for mounting cables and like objects upon a perforated support.

U.S. Pat. Nos. 3,985,324 (Larson), 3,545,711 (Scheneman), 2,884,221 (Messiep), and 2,631,804 (Uhlhorn) disclose means for mounting objects to a perforated support by using outwardly extending tabs to engage a plurality of holes in the support.

U.S. Pat. No. 2,102,977 (Shoemaker et al.) and 698,272 (Glover) also disclose means for hanging objects from perforated boards. U.S. Pat. No. 2,981,513 (Brown) discloses a tube supporting clip for use on a wire mesh.

It is an object of the invention to provide a device for securely fastening objects to a pegboard.

Another object of the invention is to provide a device for fastening objects to a pegboard which device firmly and positively grips the pegboard.

A further object is to provide a device for fastening objects to a pegboard which may be repeatedly attached to and removed from the pegboard.

Still another object is to provide a device for fastening objects to a pegboard which is simple and does not require complex manipulation to use.

It is also an object to provide a device for fastening objects to a pegboard which is a single piece.

Still another object is to provide a device for fastening objects to a pegboard which is easily and economically fabricated.

Another object is to provide a device for fastening the detachable sockets of a socket drive set to a pegboard.

Other objects will be apparent to those skilled in the art to which the invention pertains from the description to follow and from the appended claims, and by reference to the drawings, in which:

The preferred embodiments of the invention comprise a fastener for use with a pegboard. Such pegboards are well known. They consist of a flat board with a plurality of holes therein. The holes form a grid work on the board and are regularly spaced at uniform intervals. Usually but not essentially there is a lateral distance of one inch between centers of adjacent holes, and a vertical distance of one inch between centers of adjacent holes.

Figure 2:
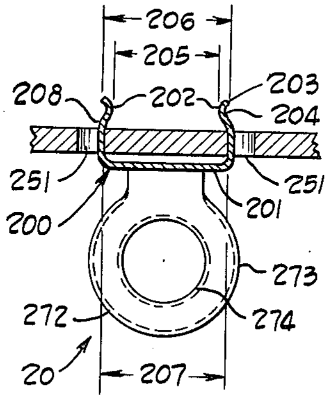
FIG. 2 is a cross-sectional view taken substantially along the line 2—2 of FIG. 1.
Figure 3:
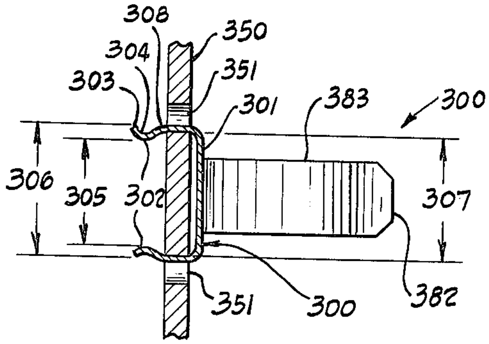
FIG. 3 is a cross-sectional view taken substantially along the line 3—3 of FIG. 1.
Figure 4:
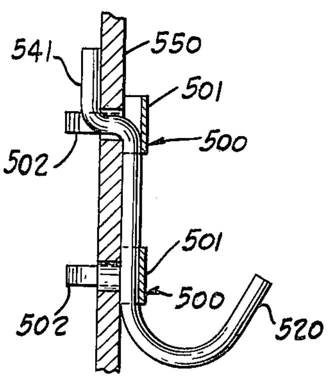
FIG. 4 is a cross-sectional view taken substantially along the line 4—4 of FIG. 1.
Figure 5:
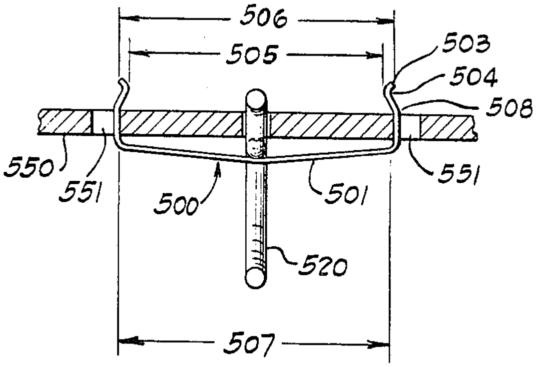
FIG.5 is a cross-sectional view taken substantially along the line 5—5 of FIG. 1.
Figure 6:
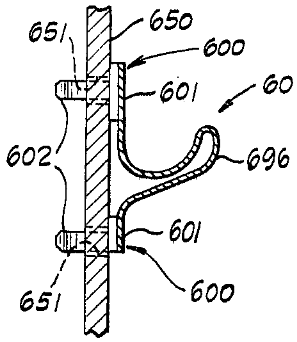
FIG. 6 is a cross-sectional view taken substantially along the line 6—6 of FIG. 1.

In one embodiment 20 of the invention a fastener 200 spans two horizontally adjacent holes, as shown in FIG. 2. In another embodiment 30 of the invention a fastener 300 spans two vertically adjacent holes, as shown in FIG. 3. In yet another embodiment 50 of the invention a fastener 500 spans a distance between two non-adjacent holes, as shown in FIGS. 4 and 5. In still another embodiment 60 of the invention two fasteners 600 are used, as shown in FIG. 6. The fastener may be permanently attached to an object retaining means as shown in FIGS. 2, 3 and 6 and may also be used with a separate object retaining means, as shown in FIGS. 4 and 5.

The fastener of the present invention is comprised of a central section or segment adapted to span the distance between a pair of preselected holes or apertures in the pegboard. For example, as shown in FIGS. 2–5, the fastener 200 includes a central section 201 spanning holes 251, the fastener 300 includes a central section 301 spanning the holes 351, and the fastener 500 includes a central section 501 spanning the holes 551.

The central section of the fasteners of some embodiments of the present invention have opposing, sigmoidally shaped resilient hooks, preferably formed at the ends of the central section, for engaging the pegboard and firmly restraining the fasteners therein. Viewing the fastener 200 of FIG. 2 as exemplary of the fasteners shown in FIGS 1-6, the central section 201 has opposing sigmoidally shaped hooks 202 at opposing ends. These opposing hooks 202 are adapted to be inserted into different holes in the pegboard. By "sigmoidally shaped" is meant that each of the hooks are curved in two directions, first, inwardly toward each other to grip the pegboard and secondly, outwardly away from each other at the ends of the hooks to provide easy insertion of the fastener into openings or apertures in the pegboard. Thus, the hooks are basically "S-shaped".

More specifically, the hooks 202 may be described as having distal ends 203 furthest from the central section 201. Between each of the distal ends 203 and the central section 201 is a mediate portion 204 of the hook. Each hook is formed into an inwardly directed arch along at least some part of each mediate portion 204. The shortest distance 205 between the mediate portions of opposing hooks, which is the distance between the most inwardly formed parts of the arch of each hook, is somewhat less than the shortest distance 207 between the holes 251 into which the hooks are inserted. Thus, when the hooks are inserted into holes in the pegboard, the portion of the pegboard between the holes is cooperatively gripped between each pair of opposing hooks. Preferably, the hook is dimensioned so that part of the hook engages the pegboard at the edge 208 between the rear of the pegboard and the side of the hole in the pegboard. The fastener is thereby retained to the pegboard by gripping the portion of the pegboard between the holes by gripping the pegboard between the front and rear, as well as gripping the pegboard against the sides of the holes.

The distal end 203 of each hook is outwardly directed. Thus, the distal ends are formed to assist in inserting and removing the fastener from the pegboard. The greatest distance 206 between the distal ends 203 of the opposing hooks is preferably somewhat greater than the shortest distance 207 between the holes into which the hooks are inserted. One hook is inserted into one hole in the pegboard and then the opposing hook is inserted into another hole by exerting pressure on the central section of the fastener. Since the distal ends of opposing hooks are further than the holes, and since the hooks are curved outwardly at the distal ends, the second hook slides over the edges of the second hole in the pegboard and the hook then snaps against the pegboard. If both of the hooks were simply "C-shaped," that is, if the distal ends turned inwardly toward each other, it would be more difficult to insert the hooks. Furthermore, using outwardly turning distal ends reduces wear on the pegboard, especially upon repeated insertions and removals of the hooks. However, an accentuated outward turn, even to the point that the distance 206 is the widest dimension of the fastener is preferred.

Figure 1:
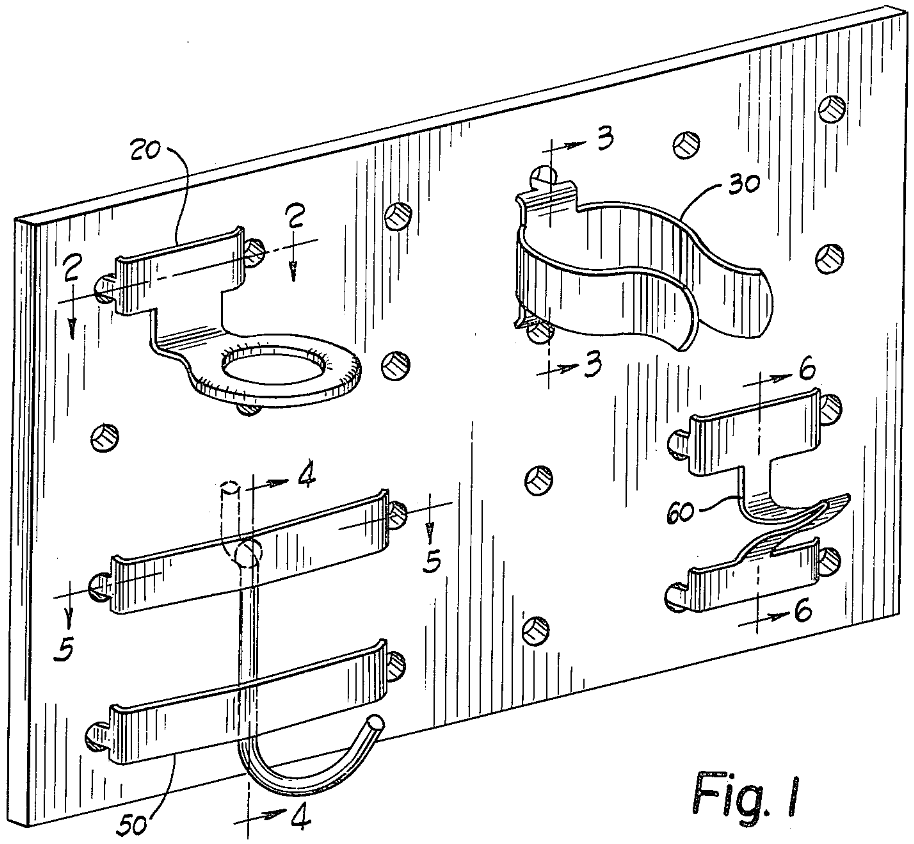
FIG. 1 is a perspective view of several embodiments of the device of the present invention shown to be mounted on a pegboard.

The embodiment of the invention shown in FIG. 2 and at 20 in FIG. 1 further comprises a tool holder 272 attached to the fastener 200. The tool holder 272 has a member 273 extending outwardly from the fastener in a plane transverse to the face of the pegboard. This member has a hole 274 therein for receiving the shaft of a screwdriver, the handle of a hammer, and the like.

As can be seen in FIG. 3, another embodiment of the invention 30 has a fastener 300 having substantially the same configuration and works in the same manner as has already been described. The fastener 300 has a central section 301 which spans holes 351 in the pegboard 350. At each end of the central section 301 there are formed opposing sigmoidally shaped hooks 302. The hooks have outwardly distal ends 303. Between each of the distal ends 303 and the central section 301 is a mediate portion 304 of the hook. At least some of the mediate portion is formed into an inwardly directed arch. The shortest distance 305 between mediate portions of opposing hooks is less than the shortest distance 307 between the holes 351. The greatest distance 306 between distal ends 303 of opposing hooks is preferably greater than the shortest distance 307 between the holes. Preferably the hook is dimensioned to engage the pegboard at the edge 308 between the rear of the pegboard and the side of the hole 351.

The embodiment of the invention shown in FIG. 3 and at 30 in FIG. 1 differs somewhat from the previously described embodiment. The embodiment of the invention shown in FIG. 3 and at 30 in FIG. 1 further comprises a tool holder 382 attached to the fastener 300. The tool holder 382 comprises two curved arms 383 which together form a clasp for gripping the handle of a tool or the like between them. In addition, the opposing hooks of the fastener 300 in FIG. 3 are inserted into vertically adjacent holes in the pegboard rather than horizontally adjacent holes as in FIG. 2.

Other tool holders and similar means for retaining objects are well known in the art and may be adapted for use with the fasteners according to the invention herein. The embodiment of the invention shown in FIGS. 4 and 5 and at 50 in FIG. 1 comprises a fastener 500 used to secure a common "J" hook 520 to a pegboard 550. Such "J" hooks are widely used for retaining objects to pegboards. Instead of a "J" hook, it is common to substitute other hooks or rings or the like. Previously such "J" hooks and the like have been fastened to the pegboard simply by means of its integrally formed outwardly extending tab 541. However, such "J" hooks and the like can be more securely fastened when used in conjuction with a fastener according to the invention. Thus, use of fasteners according to the invention eliminates the annoying problem of the "J" hook, ring, or the like moving when the tool is removed. FIGS. 4 and 5 show a "J" hook inserted into a pegboard as usual. A fastener 500 which spans three holes is then inserted into holes on either side of the "J" hook. FIGS. 1 and 4 show two fasteners being used, although one could be used alone. The fasteners 500 have substantially the same configuration and work in the same manner as the fasteners of FIGS. 2 and 3 except that fasteners 500 span nonadjacent holes in the pegboard. Each fastener 500 has a central section 501 which spans holes 551 in the pegboard 550. At each end of the central section 501 there are formed opposing sigmoidally shaped hooks 502. The hooks have outwardly formed distal ends 503. Between each of the distal ends 503 and the central section 501 is a mediate portion 504 of the hook. At least some of the mediate portion 504 is formed into an inwardly directed arch. The shortest distance 505 between mediate portions of opposing hooks is less than the shortest 507 between the holes 551. The greatest distance between distal ends 503 of opposing hooks is preferably greater than the shortest distance 507 between the holes. Preferably, the hook is dimensioned to engage the pegboard at the edge 508 between the rear of the pegboard and the side of the hole 551.

FIG. 6 and FIG. 1 at 60 show a device for mounting objects on a pegboard in which a "J" hook 696 is integrally formed with two fasteners 600 according to the invention for securing the device to the pegboard 650 by inserting the ends of the fastener into holes 651. Each fastener 600 has a central section 601 with opposing sigmoidally shaped resilient hooks 602 at each end as already described above for other embodiments.

When a fastener of any of the embodiments of the invention shown in FIGS. 1-6 is attached to the pegboard by inserting the hooks at opposing ends into different holes in the pegboard, the fastener is retained to the pegboard by cooperative reactive spring action of the two opposing hooks which together grip the portion of the pegboard between the holes by gripping against the sides of the holes or the rear of the pegboard, and preferably against both. The shortest distance 205, 305, 505 between mediate portions of opposing hooks is smaller by a gripping effective amount than the shortest distance 207, 307, 507 between the holes in the pegboard into which the hooks are inserted. By gripping effective amount it is meant that the resilient hooks are deflected enough during insertion to create a cooperative tension between them and this tension grips the portion of the pegboard between the holes. The smaller is the shortest distance 205, 305, 505 between the mediate portions of opposing hooks, the stronger is the fastener's grip on the pegboard. Although the outwardly formed distal ends of the hooks do not actually grip the pegboard, they assist in making a strong grip by permitting the shortest distance 205, 305, 505 between mediate portions of opposing hooks to be small. Since the outwardly turned distal ends adapt the fastener for easy insertion, the shortest distance 205, 305, 505 between mediate portions of opposing hooks can be reduced without sacrificing ease of insertion. Thus, having hooks curved in two directions reduces the trade-off between ease of insertion and strength of grip.

The fastener of any embodiment of the invention may be removed by pulling one hook and then the other out of the pegboard. Removal may be aided by exerting pressure on the hooks from the rear of the pegboard, or by inserting a flat tool between the front of the pegboard and the flat section of the fastener.

It should be noted that the mediate portion 204, 304, 504 of the hooks prevents a curved surface to the edges of the holes of the pegboard as the fastener is inserted and removed. Thus, having hooks curved in two directions aids both insertion and removal, expecially repeated insertions and removals.

Because the hooks of the fastener of any embodiment of the invention are somewhat distorted while in use, and because a strong spring-like grip on the pegboard is desired, the hooks are made from a resilient material, but preferably the entire fastener is resilient. It has been found that sheet metal, including spring steel and even aluminum, provides the resiliency and durability required for the desired spring force in the hooks. The strength of metal is highly desirable because the hooks are stressed when attached to the pegboard. Furthermore, lack of brittleness makes metal expecially suited for repeated insertions and removals. Sheet metal is preferred because of economy, ease of fabrication, and durability during use. Although the hooks and the central section could be fabricated separately and then fastened together, it is preferable to fabricate the entire fastener from a single strip of metal. The strip is cut and then the ends are bent into the hooks of the desired sigmoidal shape.

Figure 7:
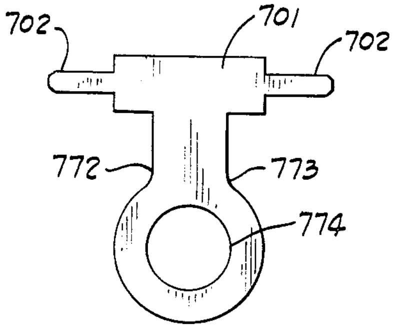
FIG. 7 is a plan view of a partially fabricated device according to a preferred embodiment of the present invention.

Preferably, the tool holder and fastener are fabricated from a single piece of sheet metal. For example, the embodiment of the invention shown in FIG. 2 and at 20 in FIG. 1 is made by cutting a piece of sheet metal into the flat design shown in FIG. 7 which includes a hole 774. The opposing hooks 702 of FIG. 7 are completed by bending them to substantially right angles with the central section 701 and into the desired sigmoidal shape shown in the hooks 202 of FIG. 2. The tool holder 772 of FIG. 7 is completed by bending member 773 to make a substantially right angle with the central section 701 thereby completing the embodiment 20 of FIGS. 1 and 2.

Figure 8:
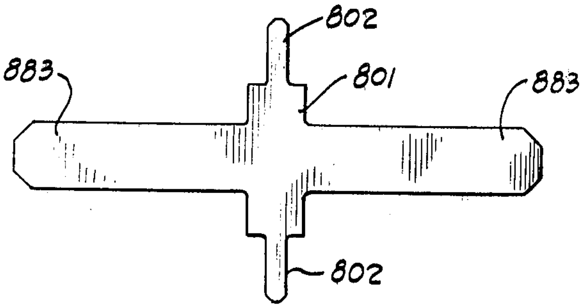
FIG. 8 is a plan view of a partially fabricated device according to an alternate preferred embodiment of the present invention.

Another example is the forming of the embodiment of the invention shown in FIG. 3 and at 30 in FIG. 1 by cutting a piece of sheet metal into the flat design shown in FIG. 8. The opposiing hooks 802 are completed by bending them to substantially right angles to the central section 801 and into the desired sigmoidal shape of the hooks 302 of FIG. 3. The arms 883 of FIG. 8 are completed by bending them at substantially right angles to the central section 801 and bending them to put opposing curves at their ends to form a clasp for gripping objects thereby completing the embodiment 30 of FIGS. 1 and 3.

Figure 9:
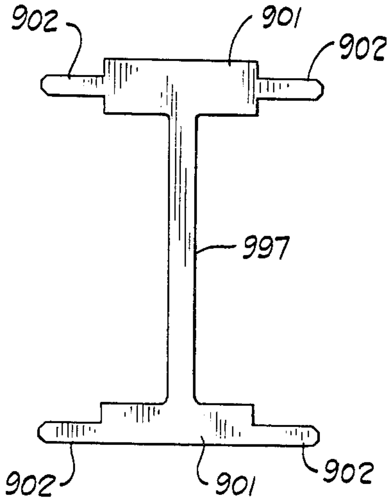
FIG. 9 is a plan view of a partially fabricated device according to another alternate preferred embodiment of the present invention.

The embodiment 60 shown in FIG. 1 and in FIG. 6 is made by cutting a piece of sheet metal into the flat design shown in FIG. 9. The opposing hooks 902 are completed by bending them to substantially right angles to the central sections 901 and into the desired sigmoidal shapes. The interconnecting strip 997 is bent double and into a hook shape to form the "J" hook 696 shown in FIG. 6.

Figure 10:
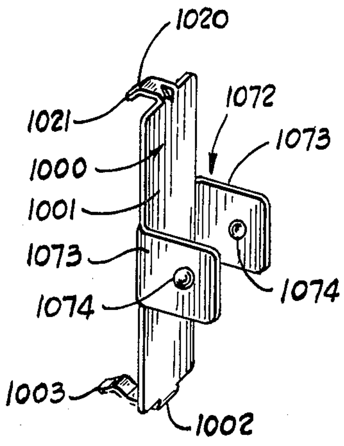
FIG. 10 is a perspective view of yet another embodiment of the present invention.
Figure 11:
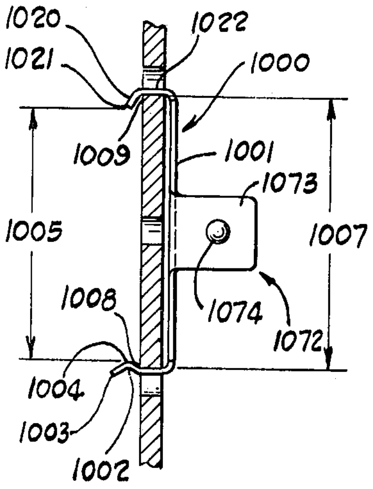
FIG. 11 is a cross-sectional view of the embodiment of the invention shown in FIG. 10 mounted on a pegboard between two vertically adjacent holes in a pegboard.

FIGS. 10 and 11 show an embodiment of the invention differing in some respects from the previously described embodiments. FIG. 11 shows a fastener 1000 spanning two vertically oriented nonadjacent holes, but it should be understood that this embodiment may be adapted for use involving horizontally oriented holes and adjacent holes. The fastener 1000 has a central web 1001 with an S-shaped hook 1002 and an opposing C-shaped hook 1020, the hooks being formed at the preferred end positions of the central web. The S-shaped hook 1002 is formed like the S-shaped hooks of the previously described embodiments, that is, it is resilient and it has an outwardly formed distal end 1003. Between the distal end 1003 and the central section 1001 is a mediate portion 1004 of the S-shaped hook 1002. Some of the mediate portion 1004 is formed into an inwardly directed arch. The C-shaped hook 1020 has a distal end 1021 and a mediate portion 1022 between the distal end 1021 and the central portion 1001. Preferably the C-shaped hook is made of resilient material. The distal end 1021 of the C-shaped hook 1020 is bent inwardly. The mediate portion 1022 of the C-shaped hook has an outwardly directed arch.

The fastener 1000 is most easily mounted on the pegboard by first inserting the C-shaped hook 1020 into one hole and then snapping the S-shaped hook 1002 into the other hole. The S-shaped hook operates in the same manner as the earlier described embodiments. The mediate portion 1004 of the S-shaped hook 1002 presents a curved surface to the edge of the hole of the pegboard as the fastener 1000 is inserted and removed, and so the hook slides in and out of the hole without damaging the pegboard. A slight outward turn of the distal end 1003 of the S-shaped hook 1002 is sufficient to aid insertion; however, an accentuated outward turn, even to the point that the distal end 1003 is the widest portion of the fastener is preferred. The C-shaped hook secures the fastener to the pegboard, but does not have all the advantages of easy insertion and removal of the S-shaped hook. The C-shaped hook tends to incur less wear than the S-shaped hook. By using a C-shaped and S-shaped hook, the resulting device has advantages of each.

The portion of the pegboard between the holes is cooperatively gripped between the C-shaped and S-shaped hooks. The shortest distance 1005 between the mediate portion 1004 of the S-shaped hook 1002 and the distal end 1021 of the C-shaped hook 1020 is smaller by a gripping effective amount than the shortest distance 1007 between the holes in the pegboard into which the hooks are inserted. By gripping effective amount it is meant that the S-shaped hook is deflected enough during insertion of the fastener to create cooperative tension between the hooks and this tension grips the portion of the pegboard between the holes. Preferably the C-shaped hook is also resilient and is also somwhat deformed during insertion and thereby further aids in developing the gripping tension between the hooks.

Preferably, the hooks are dimensioned so that a part of each hook engages the pegboard at the edges 1008, 1009 between the rear of the pegboard and the sides of holes in the pegboard. The fastener 1001 is thereby retained to the pegboard by gripping the portion of the pegboard between the holes by gripping the pegboard between the front and rear, as well as gripping the pegboard against the sides of the holes.

The embodiment of the invention shown in FIGS. 10 and 11 further comprises a tool holder 1072 attached to the fastener 1001. The tool holder is specially adapted for receiving detached sockets of a socket wrench set and has a pair of opposing tabs 1073, each having an outwardly formed dimple 1074 thereon. The pair of tabs 1073 are dimensioned so that the pair will simultaneously fit within the drive end of a socket (the drive end is the end which is fitted to the driver wrench). The dimples serve to engage the inside of the socket and hold it in place. Preferably, the pair of tabs 1073 are dimensioned so that the distance between the free ends admit easy insertion into the drive end of the socket, but the distance between the ends of the tabs which attach to the central portion of the fastener is sufficient to cause the tabs to be pressed together as the socket is fully pushed against the fastener, thereby tensioning the dimples against the inside of the socket.

The tabs 1073 on the embodiment of the invention shown in FIGS. 10 and 11 may be made in a selection of sizes so as to fit a variety of sockets. For example, when one desires to hang the various sockets of an American socket wrench set, some tabs will be dimensioned to receive ½" drive ends, others to receive ¼" drive ends, and so on. Alternatively, the tabs could be made to be received in the work end of the socket, however, this is less convenient because sockets with the same size drive end may have various size work ends.

The preferred embodiment described herein fulfill the objects of the invention. A simple to use and economical device for mounting objects to pegboards is provided. The fastener according to the invention may be easily and repeatedly inserted and removed from pegboards, but it nevertheless provides a strong, spring like grip on the pegboard. The tool holder and fastener according to the invention is preferably made from a single piece of sheet metal and requires no complex manipulation to use.

The invention has been described with particular reference to the preferred embodiments, and with reference to preferred materials, sizes, shapes and adaptations for particular tools. It will be understood however that other variations and modifications within the spirit and scope of the invention may occur to those skilled in the art to which the invention pertains.

What I claim is:

1. A device adapted to be received on an apertured panel for supporting an object thereon, said device comprising:

a central section adapted to span a distance between two preselected laterally spaced holes in said apertured panel;

gripping means comprising opposing, sigmoidally shaped, resilient hooks provided at opposite lateral ends of said central section, each of said hooks being adapted to be sprung apart for insertion into a different one of said preselected holes in the panel and having cooperative reactive spring action to securely lock said device in a selected position to the panel;

said opposing hooks each having relatively approaching inwardly extending portions spaced a substantially lesser distance from each other than the distance between the two preselected holes into which the hooks are projected thereby preventing the said hooks from disengagement from said holes during support of an object thereby, each said hook having an intermediate arch portion adapted to be disposed inwardly of the hole into which it is projected and having outwardly directed distal ends curved in opposite direction to its opposite hooks.

2. A device adapted to be received on an apertured panel for supporting an object thereon, said device comprising:

a central section adapted to span a distance between two preselected space holes in said apertured panel;

gripping means comprising opposing, sigmoidally shaped, resilient hooks provided at opposite lateral ends of said central section, each of said hooks being adapted to be sprung apart for insertion into a different one of said preselected holes in the panel and having cooperative reactive spring action to securely lock said device in a selected position to the panel;

said opposing hooks having inwardly extending portions spaced a lesser distance than the distance between the two preselected holes into which the hooks are projected;

means for retaining objects, said retaining means being attached to said central section;

said retaining means includes a means for retaining a socket of a socket driver set comprising at least two opposing, dimpled tabs adapted for reception within the socket, said tabs being dimensioned to tension the dimples against the inside of the socket.

3. A device adapted to be received on an apertured panel for supporting objects thereon, said fastener comprising:

a central section dimensioned to span the distance between a pair of holes in the said panel;

hooks formed at opposing positions at said central section for gripping a portion of the panel between them in cooperative tension, each said hook being adapted for insertion within one said hole, one of said hooks being substantially S-shaped including a resilient, inwardly directed arched portion and an outwardly directed distal end, the other of said hooks being substantially C-shaped including an inwardly directed distal end, the distance between said inwardly directed arched portion of one hook and the inwardly directed distal end of the other hook being less than the distance between said pairs of holes by a gripping effective amount, the fastener gripping the panel between the holes and gripping panel portions surrounding the holes;

means for retaining objects, said retaining means being attached to said central section.

4. A device for a pegboard, as claimed in claim 3, wherein said device is sheet metal.

5. A device, as claimed in claim 3, wherein said device comprises an integral central section and hooks.

6. A device, as claimed in claim 3, wherein said retaining means includes a means for retaining a socket of a socket driver set comprising at least two opposing, dimpled tabs adapted for reception within the socket, said tabs being dimensioned to tension the dimples against the inside of the socket.

* * * * *